(12) United States Patent
Zaidi et al.

(10) Patent No.: US 7,107,044 B1
(45) Date of Patent: *Sep. 12, 2006

(54) VIRTUALIZATION OF HARDWARE USER-INTERFACE USING A SHARED MAILBOX BETWEEN TWO PROCESSORS IN A FEATURE PHONE

(75) Inventors: Syed Zaidi, Fremont, CA (US); Sandeep Kumar, Santa Clara, CA (US); Sai K. Pothana, Sunnyvale, CA (US)

(73) Assignee: NeoMagic Corp., Santa Clara, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 10/904,336

(22) Filed: Nov. 4, 2004

Related U.S. Application Data

(63) Continuation-in-part of application No. 10/710,238, filed on Jun. 28, 2004, now Pat. No. 6,987,961.

(51) Int. Cl.
*H04M 1/00* (2006.01)

(52) U.S. Cl. .................. 455/412.1; 455/550.1

(58) Field of Classification Search ............. 455/168.1, 455/551, 412.1, 550.1; 379/88.19, 196; 370/352, 370/401; 709/212, 232; 710/240; 713/201; 718/104

See application file for complete search history.

(56) References Cited

U.S. PATENT DOCUMENTS

| | | | |
|---|---|---|---|
| 4,374,409 A | 2/1983 | Bienvenu et al. .......... 718/106 |
| 5,625,675 A * | 4/1997 | Katsumaru et al. ....... 379/88.25 |
| 5,794,054 A | 8/1998 | Le et al. ..................... 710/240 |
| 5,842,015 A | 11/1998 | Cunniff et al. .............. 718/104 |
| 5,912,951 A * | 6/1999 | Checchio et al. ......... 379/88.22 |
| 5,943,397 A * | 8/1999 | Gabin et al. ................ 379/67.1 |
| 5,943,409 A * | 8/1999 | Malik ..................... 379/209.01 |
| 6,105,098 A * | 8/2000 | Ninose et al. ............... 710/200 |
| 6,169,911 B1 | 1/2001 | Wagner et al. .............. 455/566 |
| 6,327,352 B1 * | 12/2001 | Betts et al. .................. 379/189 |
| 6,393,108 B1 * | 5/2002 | McElwee ................. 379/88.19 |
| 6,961,590 B1 * | 11/2005 | Toebes ....................... 455/564 |
| 6,987,961 B1 * | 1/2006 | Pothana ................... 455/412.1 |
| 2002/0055979 A1 | 5/2002 | Koch et al. ................. 709/212 |
| 2004/0176059 A1 * | 9/2004 | Hayem et al. ........... 455/168.1 |

\* cited by examiner

*Primary Examiner*—Naghmeh (Melody) Mehgrpour
(74) *Attorney, Agent, or Firm*—Stuart T. Auvinen

(57) ABSTRACT

A feature phone has two processors that share a key pad for user input. The key pad is attached to a base-band processor and sends an interrupt to a user-hardware-interrupt UHI driver running on the base-band processor when the user presses a key. When a hot switch indicates that the local base-band processor has the focus, a key-press event is sent to the local kernel to be sent to programs on the base-band processor. When the hot switch indicates that a remote applications processor has the focus, a message for the event is written through a shared-memory interface to a shared memory on the applications processor. A shared mailbox is written with the message length, triggering a mailbox-interrupt to the applications processor. A virtual UHI driver running on the applications processor reads the event message from the shared memory and passes key-press information to programs on the applications processor.

21 Claims, 8 Drawing Sheets

ON BB PROC:

VIRTUALIZATION OF HARDWARE USER-INTERFACE USING A SHARED MAILBOX BETWEEN TWO PROCESSORS IN A FEATURE PHONE

RELATED APPLICATION

This application is a continuation-in-part of the application for "Ethernet Emulation Using a Shared Mailbox Between Two Processors in a Feature Phone", U.S. Ser. No. 10/710,238, filed Jun. 28, 2004 now U.S. Pat. No. 6,987,961.

FIELD OF THE INVENTION

This invention relates to mobile feature phones, and more particularly to virtulazing and sharing a user-input device on a feature phone using a shared-mailbox interface.

BACKGROUND OF THE INENTION

One of the more widely used electronic devices today is the mobile or cellular phone. Improvements in capabilities and features have been made as newer generations of mobile phones and infrastructure are introduced. Third and fourth generation (3G and 4G) phones can access high-bandwidth cellular networks, enabling video, gaming, and other multimedia services.

While there may be various implementations of feature phones, a dual-processor implementation is sometimes used. FIG. 1 shows a feature phone with two processors. Feature phone 10 has advanced capabilities, and includes applications processor 20 to execute programs that implement some of these more advanced features, such as H.264 or MPEG-4 video encoding and decoding, camera support, and MP3 audio player support.

Radio-frequency RF circuit 22 includes one or more chips and transmits and receives radio signals over the antenna of phone 10. These signals are converted to digital form and communicated with base-band processor 24. Control of the transceiver and implementation of cellular communications protocols is handled by base-band processor 24.

Information such as phone numbers, call status, and menus are displayed to a phone user on display 12, which may be a liquid crystal display (LCD). Keypad 14 accepts user-inputted phone numbers and text, with keys for sending and ending a call in addition to numeric telephone keys. Control over keypad 14 is handled by base-band processor 24, while display 12 is controlled by applications processor 20.

A separate applications processor 20 can provide a more robust phone platform since base-band processor 24 does not have to been significantly altered for advanced features, which are executed on applications processor 20.

User data such as call logs, phone numbers, and user preferences are stored in memory 16. Memory 16 can be a static random-access memory (SRAM), flash, or other non-volatile memory. Memory 16 can be accessed by base-band processor 24 and/or by applications processor 20. Data can be shared when both processor have operating systems that can recognize file formats used by the other processor.

Some data must be transferred between base-band processor 24 and applications processor 20. For example, video or picture data may be received over the cell network by base-band processor 24 and transferred to applications processor 20 for further processing, or a digital camera image captured by applications processor 20 may be sent to base-band processor 24 for transmission over the cell network.

The desire to reduce the size of the phone as much as possible may require that peripheral devices be shared among the two processors. For example, keypad 14 can be controlled by base-band processor 24. However, sometimes user key presses are for controlling execution of programs that are executing on applications processor 20 rather than on base-band processor 24. It may be desirable to transfer key press information from base-band processor 24 to applications processor 20 in such as situation.

The interface between applications processor 20 and base-band processor 24 may be difficult to use. For examples, special software drivers may need to be written for execution on both applications processor 20 and base-band processor 24 for transferring various types of data. Lower-level software or operating system modules may need to be modified. Such changes require extensive compatibility testing to ensure that the phones do not fail in the field.

The parent application disclosed a feature phone with a base-band processor and applications processor that used a shared-mailbox interface between the two processors. The parent application disclosed emulating a network such as Transport-Control-Protocol/Internet Protocol (TCP/IP) and Ethernet using this shared-mailbox interface.

What is desired is a feature phone with a user interface shared among the applications processor and base-band processor. It is desired to use the shared mailbox interface between the processors for relaying key-press information. Virtualizing the user-input device using the shared-mailbox interface is desirable.

DETAILED DESCRIPTION

The present invention relates to an improvement in feature phones. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that user-input to the keypad could be input to a client application executing on the base-band processor, and be sent to a server on the applications processor. Compute-intensive tasks such as 3D games could be executed on the applications processor, but coupled to the user through viewer client applications running on the base-band processor.

Figure 1:
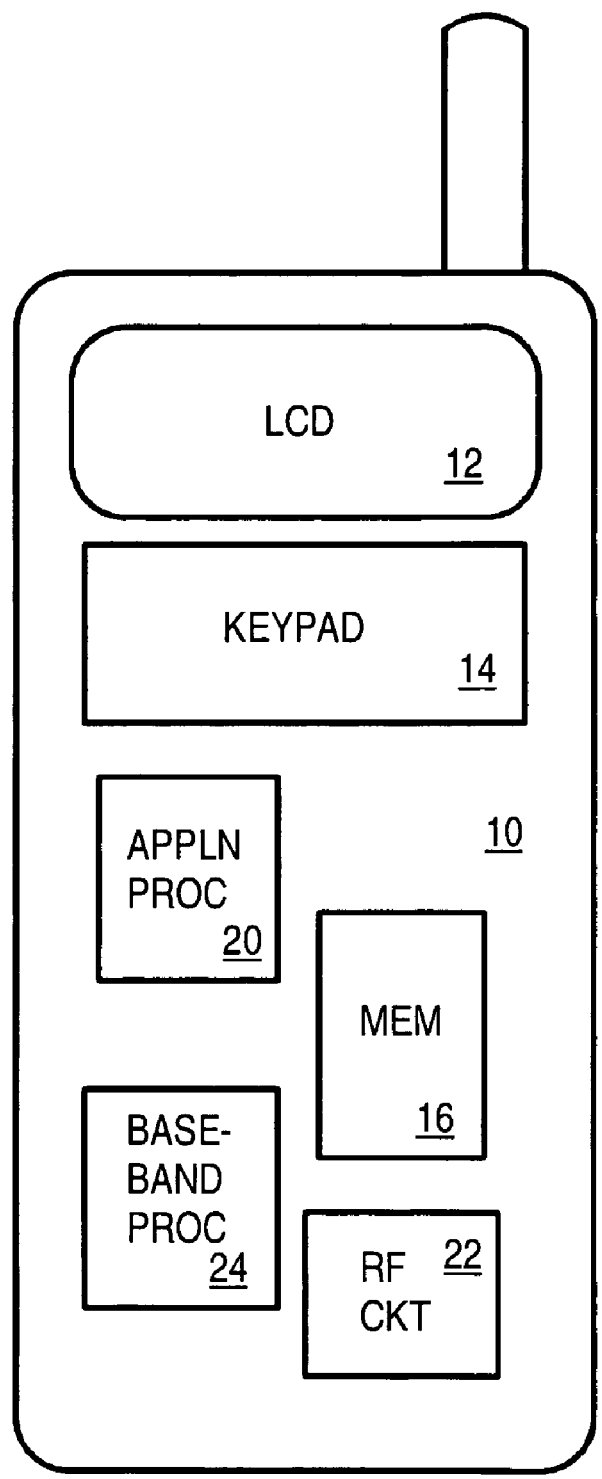
FIG. 1 shows a feature phone with two processors.
Figure 2:
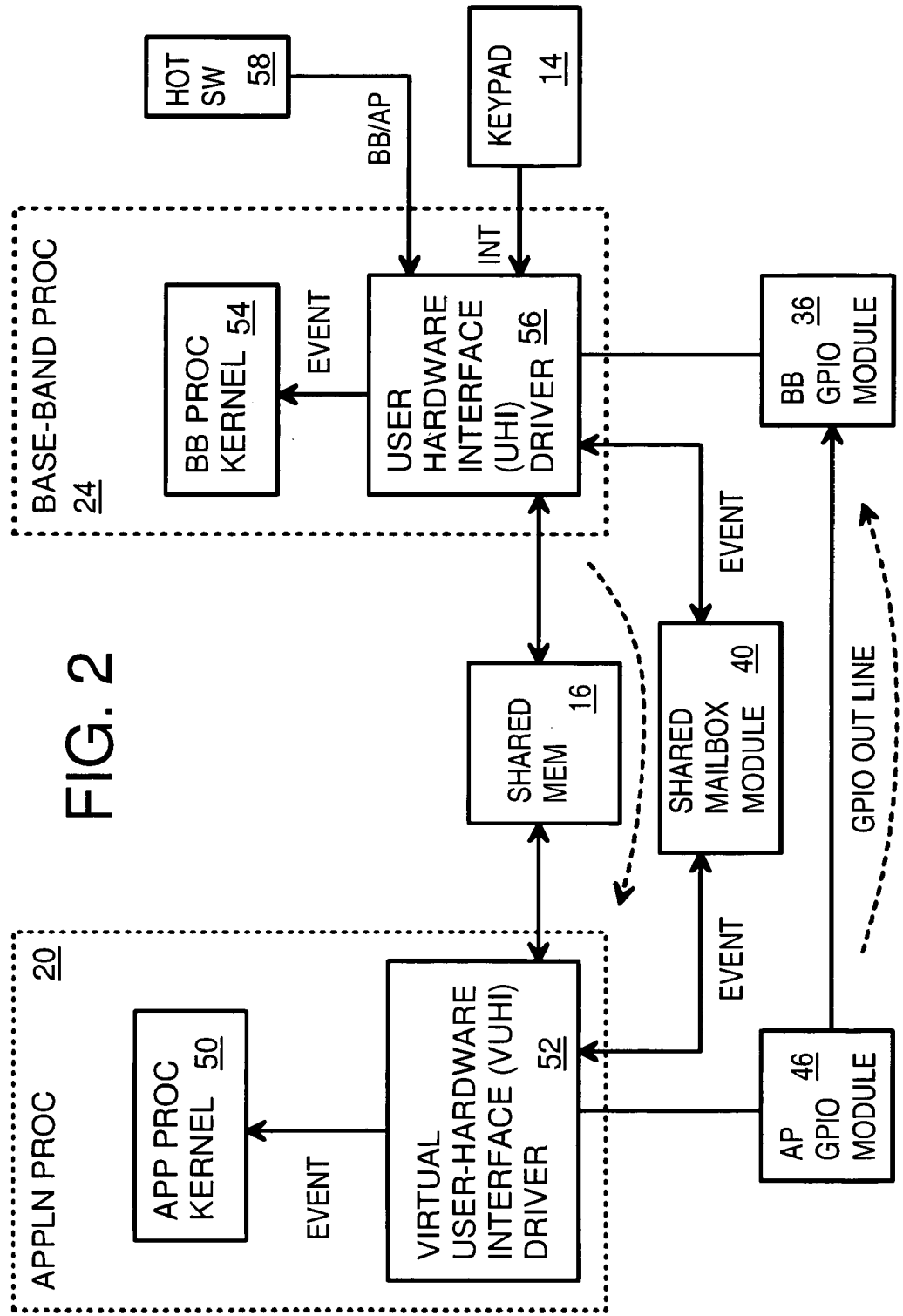
FIG. 2 shows processors in a feature phone using a shared-mailbox interface to share a key pad.

FIG. 2 shows processors in a feature phone using a shared-mailbox interface to share a key pad. Application-processor kernel 50 executing on applications processor 20 executes applications that may require user input from keypad 14. However, keypad 14 is connected to base-band processor 24, not to applications processor 20.

When the user presses a key on keypad 14, an interrupt is generated to user-hardware-interface (UHI) driver 56, which is executing on base-band processor 24. Normally, when base-band processor kernel 54 is executing user-controlled programs on base-band processor 24, any UHI interrupts generate an event that is sent up to base-band processor kernel 54 and can be sent on to the executing application.

Hot switch 58 is a hardware or software switch that indicates which of processors 20, 24 has the focus and is in control of keypad 14. A user could toggle a mechanical switch to execute applications programs that run on applications processor 20, rather than basic phone operations that execute on base-band processor 24. However, a software-controlled switch such as a register bit could also be used. A control program could toggle the register bit when an applications program is to be executed on applications processor 20, and the register bit could be toggled when the applications program finishes, or periodically to allow base-band processor 24 to continue executing programs. A user could click on an icon displayed by the base band processor to switch to the application processor GUI. The application processor could have a similar icon which the user clicks on to switch the focus back to the base band GUI. Also, when an incoming call occurs, the focus can automatically switch back to the base band processor.

When the focus is on applications processor 20 and the user presses a key on keypad 14, UHI driver 56 detects that hot switch 58 is set to AP for applications processor 20 rather than to BB for base-band processor 24. UHI driver 56 then sends the event to applications processor 20 rather than to base-band processor 24.

Data for the event, such as a code for the key pressed on keypad 14, can be written into shared memory 16. Once the key-press data is written to memory 16, UHI driver 56 sends an interrupt to applications processor 20 using shared mailbox 40. Shared mailbox 40 is a module on applications processor 20 that allows for inter-processor communication and message passing.

Virtual UHI driver 52 on applications processor 20 is activated by the shared-mailbox interrupt and reads the key-press data from shared memory 16. The key-press event is sent from virtual UHI driver 52 to application-processor kernel 50 and can be passed on to any program executing on applications processor 20.

Optionally, acknowledgement of the event can be returned from applications processor 20 to base-band processor 24 by sending an interrupt over a general-purpose input-output (GPIO) line using GPIO modules 46, 36. The interrupt causes base-band processor 24 to activate UHI driver 56 to read any acknowledgement data from shared memory 16. In some embodiments such acknowledgement may not be needed or implemented.

Figure 3:
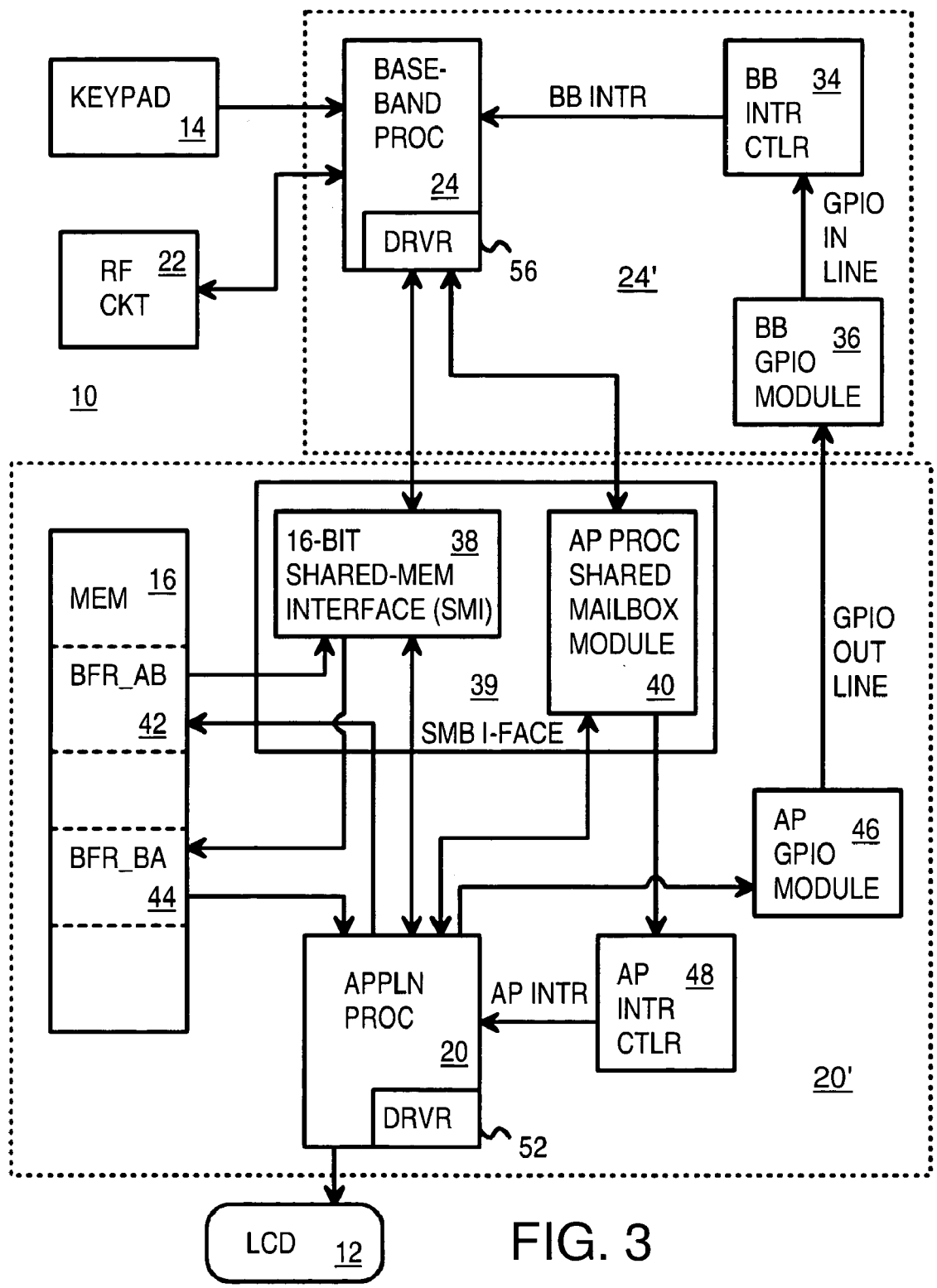
FIG. 3 is a diagram of a feature phone with key-pad virtualization through a shared mailbox.

FIG. 3 is a diagram of a feature phone with key-pad virtualization through a shared mailbox. Base-band processor 24 on base-band processor chip 24' receives user input from keypad 14 while applications processor 20 on applications processor chip 20' sends display information to the user on display 12, which can be a liquid crystal display (LCD) or other display. RF circuit 22 sends and receives phone-call data over a radio link to a cellular base station. Base-band processor 24 acts as the controlling processor while applications processor 20 acts as a subordinate processor. Rigorous testing and prior use in phones without an applications processor allow base-band processor 24 to provide a stable platform, while newer features can be executed by applications processor 20. Thus many bugs and potential phone crashes are isolated from base-band processor 24.

Advanced features are provided by high-level applications that execute on applications processor 20. A 16-bit shared-memory-interface (SMI) links applications processor 20 to base-band processor 24 through shared memory 16. Base-band processor 24 can read and write data to shared memory 16 through shared-memory interface 38 while applications processor 20 reads and writes shared memory 16 directly.

Shared memory 16 contains data and event buffers used by UHI driver 56 and virtual UHI driver 52 to pass key-press event data. A-to-B buffer 42 is written by event acknowledgement or other data from virtual UHI driver 52 when called by application-processor kernel 50 executing on applications processor 20. A-to-B buffer 42 is read by UHI driver 56 through shared-memory interface 38 when called by the kernel on base-band processor 24.

B-to-A buffer 44 is written through shared-memory interface 38 by key-press data from UHI driver 56 when an interrupt is generated by a key press of keypad 14, and the hot switch indicates that applications processor 20 has the focus. B-to-A buffer 44 is read by virtual UHI driver 52 on applications processor 20. Shared memory 16 may contain non-buffer memory, or it may be entirely used for buffer memory. For example, a 32 K-byte memory could have addresses 0–16 K for B-to-A buffer 44 and addresses 16–32 K for A-to-B buffer 42.

Since key-press interrupts may be generated at various times, the receiving processor's driver must be notified when new data has been written into shared memory 16 and is ready for reading. Interrupts are used for such notification. A GPIO line is used as an interrupt to base-band processor 24, while shared mailbox 40 in shared mailbox (SMB) interface 39 is used for interrupts to applications processor 20.

When applications processor 20 finishes writing an acknowledgement message or data to shared memory 16, applications processor 20 toggles the state of an I/O line using GPIO module 46. The changed state of the GPIO line is detected by GPIO module 36, which activates an interrupt to base-band processor 24 using base-band interrupt controller 34. Base-band interrupt controller 34 and GPIO module 36 can be integrated together with base-band processor 24 on the same chip 24' as a base-band microcontroller.

When base-band processor 24 finishes writing a key-press-event message or key data to shared memory 16 through shared-memory interface 38, base-band processor 24 writes a message into shared mailbox 40. Writing of this message causes shared mailbox 40 to generate an interrupt to interrupt controller 48 that is passed to applications processor 20. Applications processor 20 can then respond to the interrupt by activating its virtual UHI driver 52, which reads the event-message data from shared memory 16 and passes the key-press data to application-processor kernel 50 and eventually to a high-level application in applications processor 20.

Shared-memory interface 38, shared mailbox 40, interrupt controller 48, and GPIO module 46, can be integrated together with applications processor 20 as a single chip 20'. Shared memory 16 may also be integrated, or may be separate or part of a larger external memory. UHI driver 56 and virtual UHI driver 52 are software modules.

Figure 4:
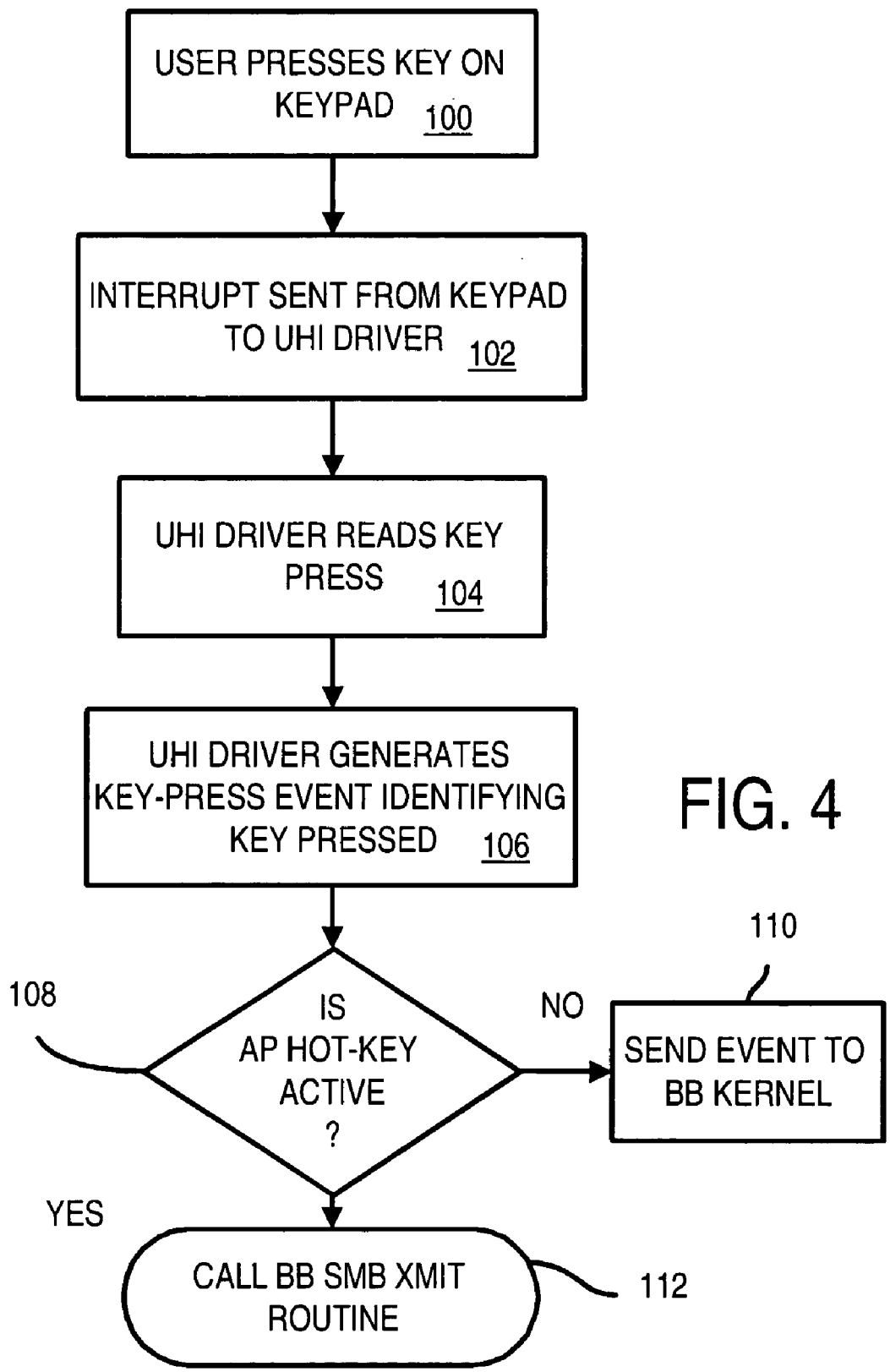
FIG. 4 is a flowchart of a key press and response by the base-band processor.

FIG. 4 is a flowchart of a key press and response by the base-band processor. When the user presses a key on the keypad, step 100, the key pad hardware detects the key press and generates an interrupt to the base-band processor, step 102. This interrupt is sent to the UHI driver. An interrupt table or other mechanism can be used to route interrupts from various sources to the intended service routines. A hardware interrupt controller may also be used to prioritize hardware interrupts.

The UHI driver is activated and reads the key press, step 104. The UHI driver may have to read registers or lines on the key pad to determine which key was pressed, and may use other drivers to accomplish this key reading. Alternately, a code identifying the key pressed may be loaded into a register that can be read, or the interrupt may point to the key code.

An event for the key press is generated by the UHI driver, step 106. The event identifies which key was pressed. The event may be embedded in a message or carried by a packet and have some formatting fields and other information. Various formatting routines may be called.

The state of the hot switch is detected, step 108, to determine whether the focus is on the applications processor or on the base-band processor. When the hot switch indicates that the local base-band processor has the focus, the event is passed up to the kernel, step 110. The local kernel can pass the event on to control programs or other programs running on the base-band processor.

When the hot switch indicates that the focus is on the applications processor that is remote from the key pad and the UHI driver, step 108, then the event is sent over the shared mailbox interface to the applications processor. A SMB transmit routine running on the local base-band processor is called, routine 112.

Figure 5:
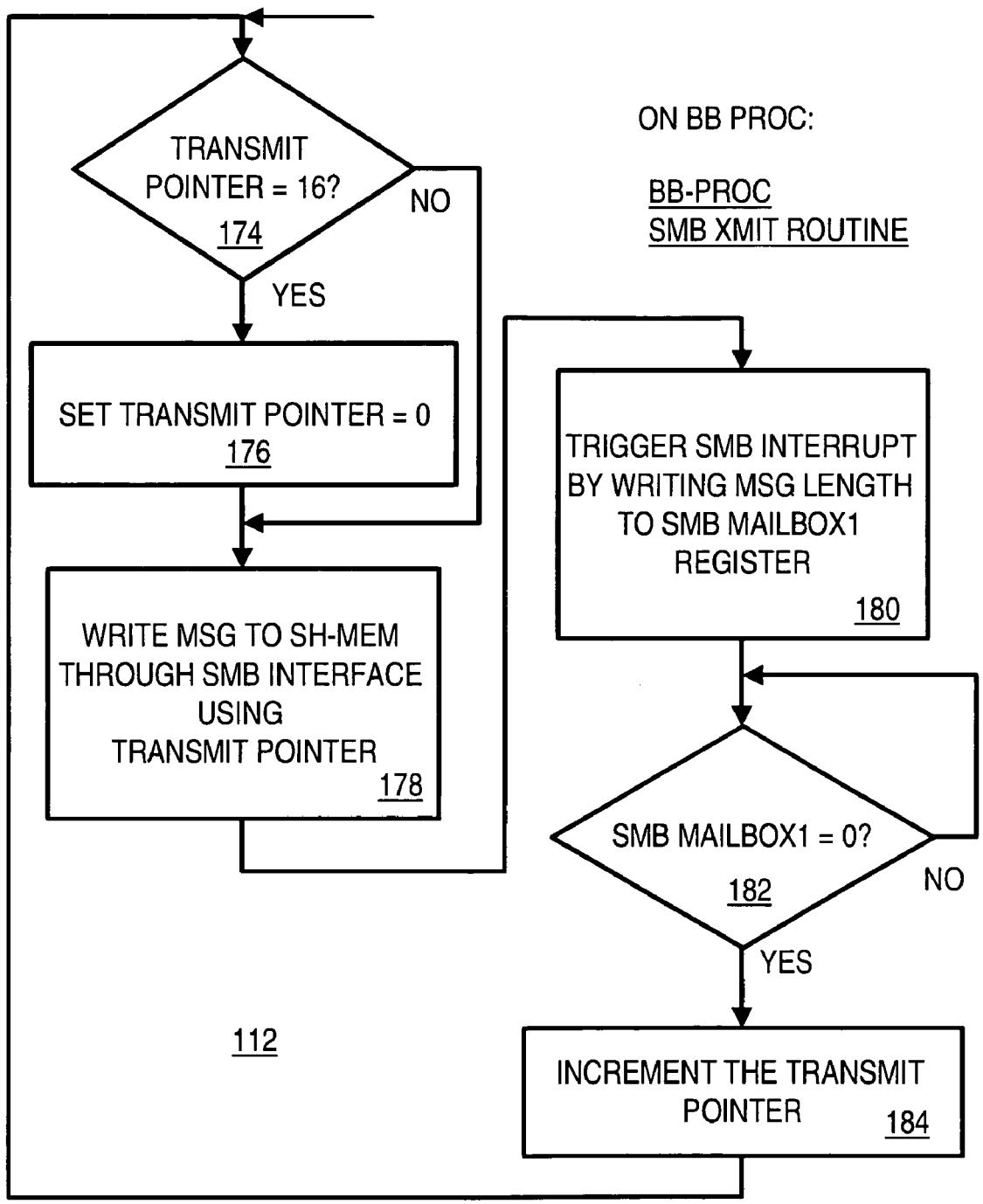
FIG. 5 is a flowchart of a shared-mailbox transmit routine that runs on the base-band processor.

FIG. 5 is a flowchart of a shared-mailbox transmit routine that runs on the base-band processor. Shared-mailbox transmit routine 112 is called when the key-press event must be sent to the other processor.

A transmit pointer keeps track of the current write location in the buffer in the shared memory. A 16-location buffer is used in this example, but other buffer lengths could be substituted. When the transmit pointer has reached the end of B-to-A buffer 44, step 174, the pointer value of 16 is wrapped back to 0, the first location in the buffer, step 176. This transmit pointer is used to select locations in the shared memory to write the key-press event data or message to, step 178. The data is written from base-band processor 24 through shared-memory interface 38 to shared memory 16.

The length of the event message is written to mailbox #1, step 180. Writing mailbox #1 also causes the interrupt to be sent to the applications processor. Sending an interrupt upon writing to the first mailbox location is a built-in function of the shared mailbox module.

The transmit routine then repeatedly re-reads or polls mailbox #1 in the shared mailbox module after some delay to allow applications processor 20 to write the mailbox. Mailbox #1 contains the message length written by base-band processor 24, but is over-written by applications processor 20 with a zero-value once applications processor 20 has read the message. Thus once a zero is read from mailbox #1, step 182, the transmitted message has been received. The transmit pointer is incremented, step 184, and the next message can be transmitted by repeating the routine.

Figure 6:
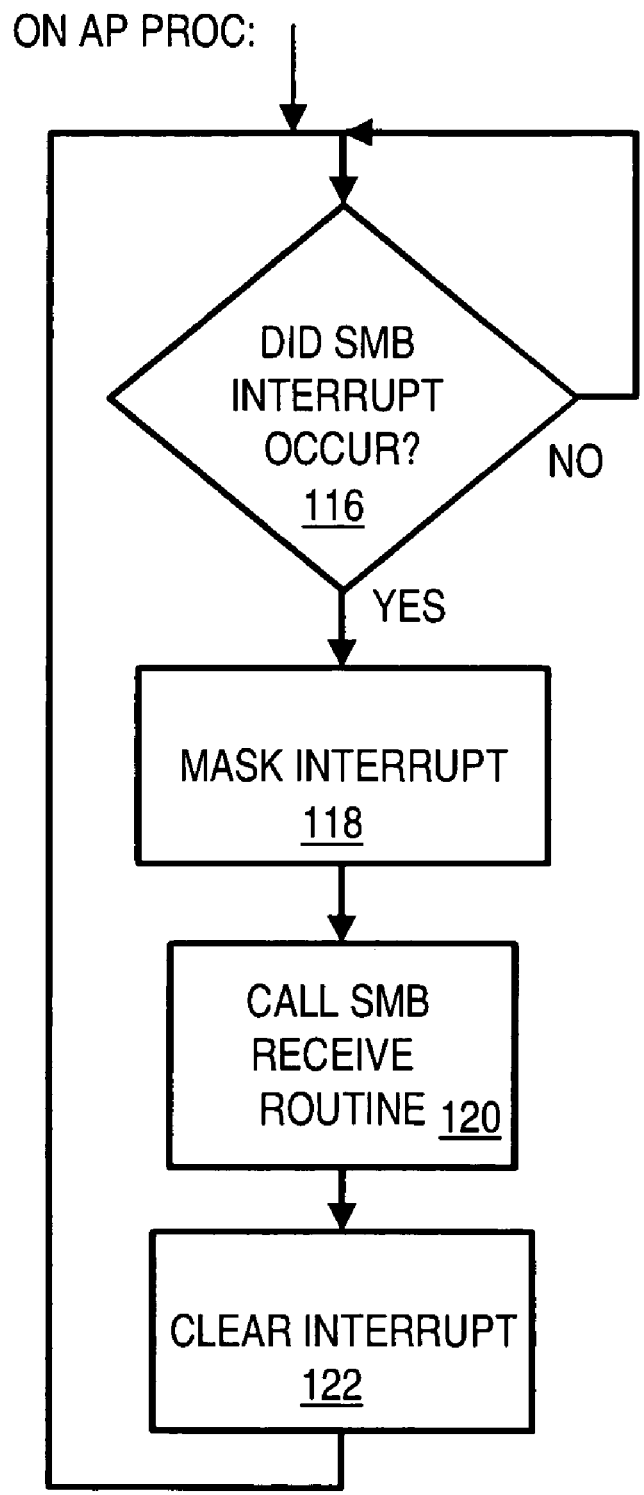
FIG. 6 is a flowchart of an interrupt checking routine executing on the applications processor.

FIG. 6 is a flowchart of an interrupt checking routine executing on the applications processor. The routine waits for the shared-mailbox interrupt to occur, step 116. An interrupt table or other interrupt handler can check for all kinds of interrupts and then send the SMB interrupt to this routine. Once this shared-mailbox interrupt is detected, the interrupt is masked, step 118, to prevent another SMB interrupt from being detected while the current interrupt is being processed.

Figure 7:
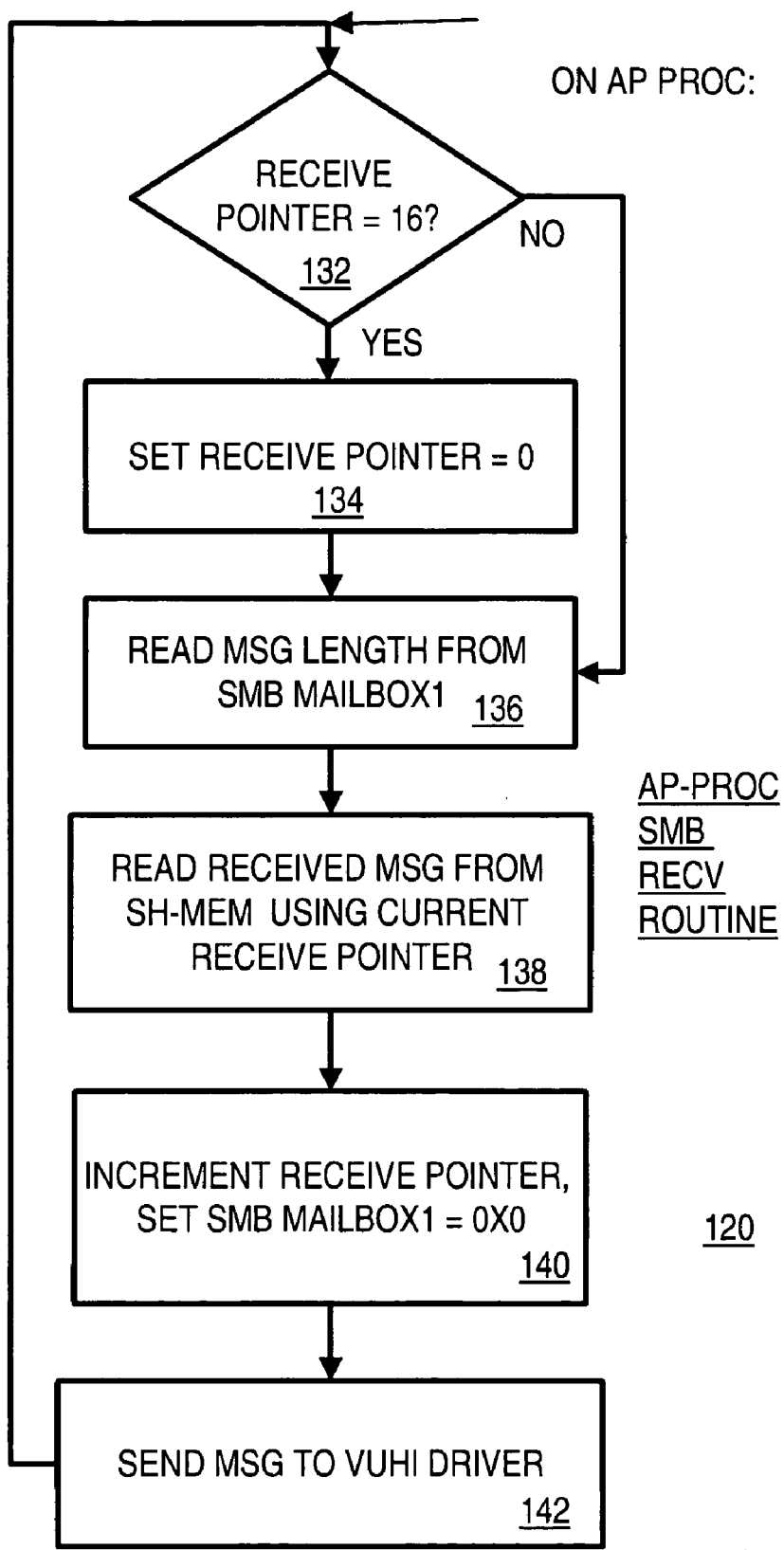
FIG. 7 is a flowchart of the receive routine for the virtual UHI driver executing on the applications processor.

The shared-mailbox receive routine 120 is called to read the event message from the shared mailbox and/or the shared memory. This receive routine 120 is shown in FIG. 7. After routine 120 has read the event message and finished processing, control is passed back to this interrupt checking routine and the interrupt is cleared, step 122. The interrupt checking routine can then wait for the next shared-mailbox interrupt to arrive, step 116.

FIG. 7 is a flowchart of the receive routine for the virtual UHI driver executing on the applications processor. Pointer locations 0–16 are in B-to-A buffer 44. When the receive pointer has reached the end of B-to-A buffer 44, the pointer value is 16, step 132. Then the pointer wraps around to the first location, by setting the receive pointer to 0, step 134. Otherwise the receive pointer is unaltered.

Shared mailbox 40 can have several internal locations, such as mailbox #1, mailbox #2, etc. The message length is read from mailbox #1 in shared mailbox 40, step 136. The message length can be less than 1 K bytes, even though the pointers increment by 1 K bytes for each message. The receive pointer is used to read the new key-press-event message from shared memory 16, step 138. Only bytes up to the message length are read. The receive pointer is incremented, and a zero-value is written to shared mailbox #1 to acknowledge receipt of the message, step 140.

The key-press-event message data read from the shared memory is sent up to the virtual UHI driver, step 142. The virtual UHI driver may remove any message headers that protocol or other information.

Figure 8:
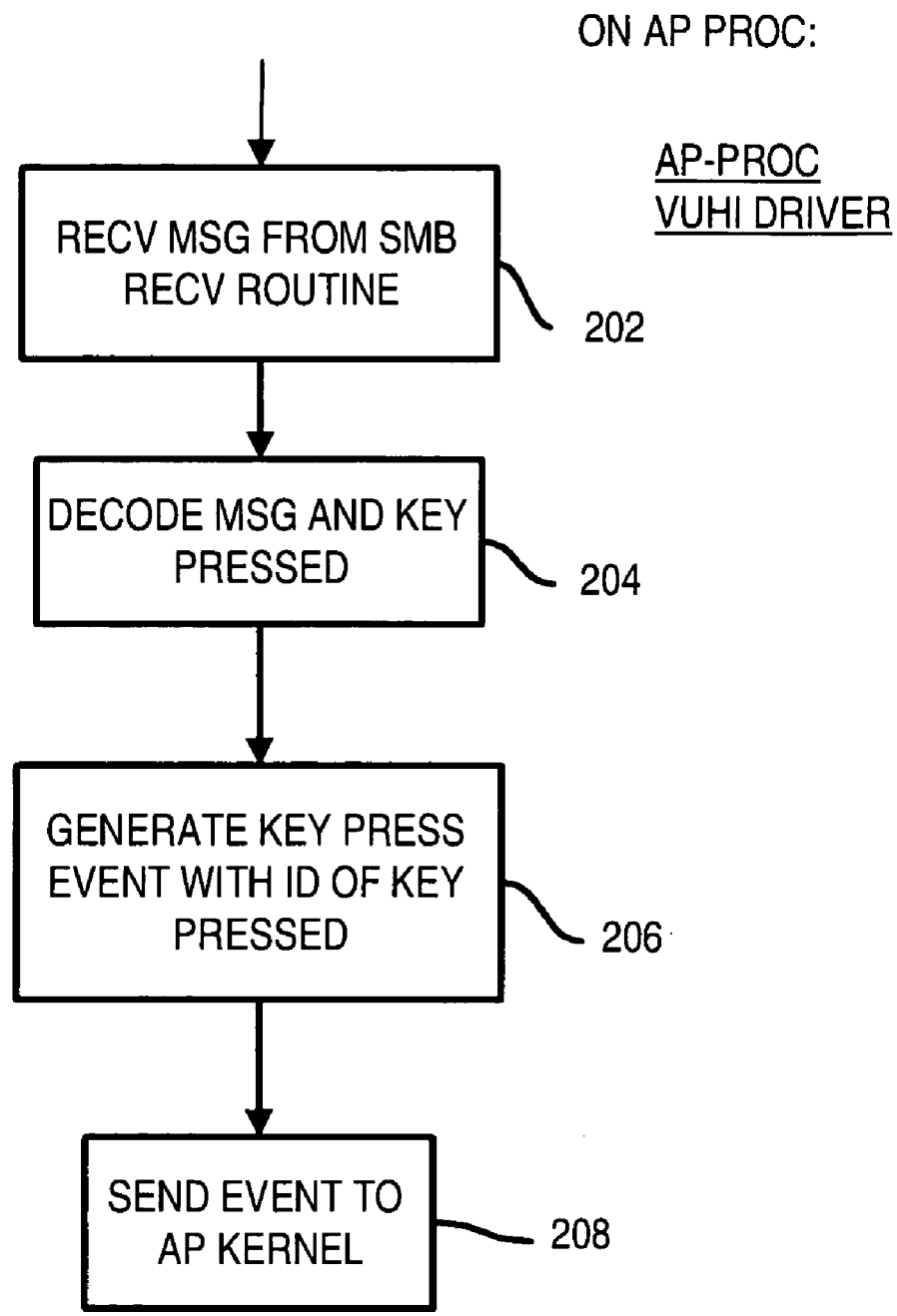
FIG. 8 is a flowchart of the virtual UHI driver processing a key-press-event message received through the shared-mailbox interface.

FIG. 8 is a flowchart of the virtual UHI driver processing a key-press-event message received through the shared-mailbox interface. The key-press-event message read by shared-mailbox receive routine 120 (FIG. 7) is sent to the virtual UHI driver, which reads this message, step 202. The virtual UHI driver decodes the message to extract the key code for the key pressed, or other key-press information in the message, step 204.

A key-press event is generated, step 206, that contains the key code or identifier for the key pressed. The format of this key-press event may be different from the event sent through the shared mailbox, since this event generated in step 206 is formatted for use on applications processor rather than for use on base-band processor. Different operating systems and kernels may be running on applications processor 20 and base-band processor 24, requiring different formats of events.

The generated key-press event is sent from the virtual UHI driver to the application-processor kernel, step 208. The kernel can pass the event or key-press information extracted from the event on to running applications programs, or call various programs or routines.

ALTERNATE EMBODIMENTS

Several other embodiments are contemplated by the inventors. For example, rather than have only a keypad as the user input device, the user input device could include a pointing device such as a mouse pad, a motion detector, or a biometric-input device such as a touch-screen or a fingerprint reader. The shared-memory interface can have a width other than 16 bits, as can other interfaces.

While key presses have been described, key releases may also be detected and responded to. Some keys may be pointing or selecting devices such as a mouse key.

Various message sizes could be stored in the shared memory, and the pointers could be advanced by these message sizes rather than by 1 K bytes. A larger word or memory line rather than a byte could be the addressing size, and pointer incrementing could be adjusted. Internal pointers may use different units than the transmit and receive pointers. Direct-memory access (DMA) could be used for data transfer and use its own DMA pointers.

The key-press event message may be so small or the mailboxes so large that the entire event could fit in the mailbox and not have to be written to the buffer shared memory. The key pad could be attached to the other (applications) processor, or to a third processor. More than 2 processors could be included in the feature phone, or sub-processors or special functional units could be used by a processor.

The shared-mailbox could itself be shared by several high-level applications or low-level drivers. Different mailbox #'s could be used for different purposes, or a message code could indicate which use the message is for. The message code could be decoded to determine which driver to call, such as the virtual UHI driver, or a display, reset routine, or other driver.

Other devices such as a shared disk drive could be attached to applications processor 20 or to base-band processor 24. Additional memories, interrupt sources, and links could be added, and additional functions supported. Hardware, software, firmware, or a variety of combinations may be used to implement various functions and modules described herein. The two processors could each be integrated with memories, interrupt controllers, and I/O devices and could even be integrated together on a large chip.

The feature phone could have a variety of integrated features and hardware, such as a camera for capturing video or still photos, phone and address books, databases, projection displays or keyboards, etc. The feature phone could be a personal digital assistant (PDA) or other handheld or wearable device with wireless communications capabilities over wireless phone networks.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dual-processor wireless-communications device comprising:
   a wireless transceiver for sending and receiving wireless data over a wireless network using wireless protocols;
   a base-band processor, coupled to control the wireless transceiver, for executing routines using a first operating system kernel including routines to transmit and receive wireless data through the wireless transceiver;
   a user-hardware-interface UHI driver, for executing on the base-band processor, activated by the first operating system kernel for processing user inputs from a user;
   an applications processor for executing application programs using a second operating system kernel;
   a shared memory having a first buffer that is written by the base-band processor and read by the applications processor;
   a keypad, coupled to the base-band processor, for receiving user inputs, the user inputs including phone numbers for placing calls over the wireless network and user inputs for controlling the application programs executing on the applications processor;
   a hot switch that indicates when the base-band processor receives user inputs and when the applications processor receives user inputs from the keypad;
   a transmit routine, activated by the UHI driver when the hot switch indicates that the applications processor receives user inputs, the transmit routine writing a key-press-event message generated by the UHI driver in response to a key press on the keypad, the key-press-event message being written to the first buffer in the shared memory;
   a shared mailbox, coupled to be written by the applications processor and by the base-band processor, having a plurality of mailbox locations, wherein writing to a first mailbox location in the shared mailbox generates a second interrupt to the applications processor; and
   a virtual UHI driver, executed by the applications processor in response to the second interrupt, the virtual UHI driver reading the key-press-event message from the first buffer in the shared memory in response to the second interrupt;
   whereby the keypad is shared by passing messages through the shared memory using the shared mailbox.

2. The dual-processor wireless-communications device of claim 1 wherein the key-press-event message includes a key code or a key identifier indicating which key on the keypad is pressed by the user.

3. The dual-processor wireless-communications device of claim 2 wherein the wireless data sent over the wireless network using the wireless protocols includes encoded voice data,
   wherein the dual-processor wireless-communications device is a feature wireless phone.

4. The dual-processor wireless-communications device of claim 2 further comprising:
   a first general-purpose input-output (GPIO) module, coupled to read a signal on a GPIO line and generate a first interrupt to the base-band processor in response to the signal on the GPIO line;
   a second GPIO module, coupled to write the signal onto the GPIO line in response to a command from the applications processor.

5. The dual-processor wireless-communications device of claim 4 further comprising:
   a first interrupt controller, coupled between the first GPIO module and the base-band processor; and a second interrupt controller, coupled between the shared mailbox and the applications processor.

6. The dual-processor wireless-communications device of claim 5 wherein the applications processor sends an acknowledgement message to the base-band processor by writing the acknowledgement message to the shared memory and by activating the second GPIO module to write the signal onto the GPIO line;

whereby the acknowledgement message is signaled to the base-band processor by the applications processor activating the GPIO line.

7. The dual-processor wireless-communications device of claim 6 wherein the shared memory also comprises a second buffer that is written by the applications processor and read by the base-band processor;

wherein the acknowledgement message is written to the second buffer by the applications processor.

8. The dual-processor wireless-communications device of claim 3 wherein the first operating system kernel and the second operating system kernel are different operating systems.

9. The dual-processor wireless-communications device of claim 3 further comprising:

a display, coupled to the applications processor, for displaying call information to a user generated by the base-band processor and for displaying applications information to the user generated by the application programs, whereby the display and the keypad are shared.

10. The dual-processor wireless-communications device of claim 3 wherein the hot switch is a user-toggled switch or is a software-controlled switch.

11. A method for sharing a user-input device between a first processor and a second processor within a mobile device comprising:

the first processor receiving a user-input interrupt from the user-input device in response to user input;

the first processor activating a user-hardware-interface driver in response to the user-input interrupt;

the user-hardware-interface driver reading a state of a hot switch, and when the hot switch is in a first state, the user-hardware-interface driver generates a local user-input event having an input identifier identifying the user input to the user-input device;

passing the local user-input event from the user-hardware-interface driver to a first kernel that executes on the first processor;

when the hot switch is in a second state, the user-hardware-interface driver generates a user-input message identifying the user input to the user-input device and writes the user-input message to a shared memory, the user-hardware-interface driver writing to a shared mailbox to generate a second interrupt to the second processor;

the second processor, in response to the second interrupt, activating a virtual user-hardware-interface driver;

the virtual user-hardware-interface driver reading the user-input message from the shared memory in response to the second interrupt; and generating a second user-input event that has the input identifier from the user-input message and passing the second user-input event to a second kernel that executes on the second processor, whereby user-input from the user-input device is sent from the first processor to the second processor when the hot switch is in the second state.

12. The method of claim 11 wherein the user-hardware-interface driver writing to the shared mailbox comprises writing a length of the user-input message to the shared mailbox.

13. The method of claim 12 further comprising:

clearing the shared mailbox by the virtual user-hardware-interface driver writing a zero to the shared mailbox.

14. The method of claim 12 wherein the mobile device is a mobile telephone, and wherein the first processor is a base-band processor and the second processor is an applications processor.

15. An applications processor that shares a user-input device attached to a base-band processor comprising:

processing means for executing high-level programs;

kernel means, executing on the processing means, for controlling execution of the high-level programs;

virtual user-hardware-interface driver means, executing on the processing means, for receiving a user-input message and for sending a user-input event to the kernel means, the user-input event having an identifier that indicates the user input to the user-input device indicated by the user-input message;

shared memory means for storing the user-input message from the base-band processor;

inter-processor interface means, coupled between the shared memory means and the base-band processor, for allowing the base-band processor to write the user-input message to the shared memory means; and shared mailbox means, coupled to the inter-processor interface means and to the processing means, for generating a first interrupt in response to the base-band processor writing to a first location in the shared mailbox means;

whereby the base-band processor writes the user-input message to the shared memory means and signals the applications processor by writing to the shared mailbox means.

16. The applications processor of claim 15 further comprising:

receive means, executing on the processing means, for reading the user-input message from the shared memory means in response to the first interrupt, the receive means passing the user-input message to the virtual user-hardware-interface driver means.

17. The applications processor of claim 16 wherein the receive means further comprises:

clearing means for clearing the first interrupt by writing to the first location in the shared mailbox means after the user-input message has been read from the shared memory means.

18. The applications processor of claim 17 further comprising:

transmit means, executing on the processing means, for writing a response message generated by the virtual user-hardware-interface driver means to the shared memory means, the response message generated in response to the user-input message; and output means, coupled to the processing means, for driving an interrupt signal onto an output line to the base-band processor.

19. The applications processor of claim 18 wherein the transmit means is also for causing generation of the interrupt signal from the output means to the output line after the response message is written to the shared memory means, whereby the user-input message and the response message are sent between processors using the shared memory means.

20. The applications processor of claim 15 wherein the user-input device is a key pad and the identifier indicating user input indicates a key pressed or released by a user.

21. The applications processor of claim 20 wherein the applications processor and the base-band processor are within a mobile telephone.

* * * * *